United States Patent
Trautwein et al.

(10) Patent No.: US 6,692,212 B2
(45) Date of Patent: Feb. 17, 2004

(54) METHOD FOR STACKING CONTAINERS COMPRISING THERMOPLASTIC, AND APPARATUS FOR EXECUTING THE METHOD

(75) Inventors: Herbert Trautwein, Kirchberg (DE); Volker Eichbauer, Flein (DE); Michael Wonzy, Heilbronn (DE)

(73) Assignee: Adolf Illig Maschinenbau GmbH & Co., Heilbronn (DE)

( * ) Notice: Subject to any disclaimer, the term of this patent is extended or adjusted under 35 U.S.C. 154(b) by 107 days.

(21) Appl. No.: 09/938,561

(22) Filed: Aug. 27, 2001

(65) Prior Publication Data

US 2002/0028128 A1 Mar. 7, 2002

Related U.S. Application Data

(63) Continuation of application No. 09/785,663, filed on Feb. 20, 2001, now abandoned.

(30) Foreign Application Priority Data

Feb. 17, 2000 (DE) .......................................... 100 07 333

(51) Int. Cl.[7] .............................................. B65G 57/16
(52) U.S. Cl. ................... 414/331.16; 53/542; 414/798.4
(58) Field of Search ...................... 53/542; 414/331.13, 414/331.14, 331.16, 790.3, 790.4, 798.4

(56) References Cited

U.S. PATENT DOCUMENTS 5,650,110 A    7/1997    Padovani .................... 264/153

FOREIGN PATENT DOCUMENTS

| DE | 73 30 214 A1 | 2/1975 |
| DE | 44 14 851 C2 | 11/1995 |
| DE | 44 28 257 A1 | 2/1996 |
| DE | 296 08 477 U1 | 10/1997 |
| DE | 44 36 531 C1 | 4/1998 |
| DE | 198 52 359 C1 | 8/2000 |

*Primary Examiner*—Janice L. Krizek
(74) *Attorney, Agent, or Firm*—Venable LLP; John P. Shannon; Stuart I. Smith

(57) ABSTRACT

The transfer of stacks comprising molded plastic containers from stacking magazines into downstream devices in terms of susceptibility to disturbances, with the molding apparatus having a large number of cycles is improved. The method requires simple format parts, and permit a rapid format change when the apparatus is converted to a different container format. This is achieved be stack cages comprising stacking-magazine rows that can be displaced perpendicular to the stacking direction and removed from the other stacking-magazine rows. They are guided to a removal station, unloaded and placed onto the stacking-magazine rows remaining on the other side in the stacking station.

11 Claims, 6 Drawing Sheets

View X

View Y

METHOD FOR STACKING CONTAINERS COMPRISING THERMOPLASTIC, AND APPARATUS FOR EXECUTING THE METHOD

CROSS REFERENCE TO RELATED APPLICATION

This application is a continuation of U.S. patent application Ser. No. 09/785,663, filed Feb. 20, 2001, now abandoned.

This application claims the priority of German patent Application No.100 07 333.6-22 filed Feb. 17, 2000, which is incorporated herein by reference.

BACKGROUND OF THE INVENTION

The invention relates to a method for stacking containers formed of a thermoplastic plastic, which containers are molded and punched out of a film strip, are transferred out of the molding tool in stacking magazines, are removed as stacks from the magazines, and then are further processed. The invention further relates to an apparatus for executing the method.

In known apparatuses (ÜG models of the Assignee, ADOLF ILLIG Maschinebau GmbH & Co.), the containers are ejected from the molding tool, which is pivoted by about 80° from the work position, directly into stacking troughs that extend flush with the transfer position in the axial direction. In another known apparatus of the Assignee, described in German Patent Document DE 198 52 359 A1, it is known to pivot the containers by 180° before stacking them in the stacking magazines so that they can be inserted bottom or floor-first into the containers that are already stacked.

In the two known embodiments, a plurality of stacking magazines forms a stacking-magazine row, and a plurality of stacking-magazine rows forms a complete stack cage—corresponding to the number of pieces molded in the molding tool. From the stack cage, all of the formed container stacks can be simultaneously removed with an ejection rake or tool and transferred into a receiving chamber in a known manner. However, it may be necessary to displace the entire stack cage in the stacking direction between two cycles to bring the ejector rake into the ejection position. With a large number of cycles and pieces, which results in a large and heavy stack cage, the process of displacing the entire stack cage, pivoting the ejection rake and returning the stack cage into the stacking position between two cycles causes time-related problems, and limits the number of cycles for the apparatus. The necessary rapid clearing of the stack cage causes the container stacks to be compressed, which impedes the separation of the containers, e.g., in filling machines and beverage machines, thereby leading to operating disturbances or problems. The rapid displacement of the stack cage requires high inertial forces, and correspondingly large drives with precise holding points, for guiding the stack cage precisely into its end position. These drives are costly.

If the containers that are ejected in stacks from the stacking magazines are to be further processed, e.g., through bordering, imprinting, or column-wise packaging in cartons, first it is necessary to transfer all of the container stacks consecutively into a row. In the known apparatuses, after all of the container stacks have been cleared, they are transferred into a format-dependent receiving chamber, in which pushing elements transfer the individual container stacks in rows onto a transversely-extending conveyor belt that cyclically transfers the individual container stacks onto a conveyor belt that runs in the stacking direction. This transfer process is susceptible to disturbances due to the drifting apart of the container stacks, depending on the container shape (amount of tapering, diameter, height). The receiving chamber is format-dependent, and must either be exchanged as a whole when the apparatus is converted, or changed over to a new container format, which is a complicated process that requires the chamber to be adjustable.

SUMMARY OF THE INVENTION

It is the object of the invention to provide a method that permits a high cycle number for the apparatus, without receiving a fast and position-precise displacement of the entire stack cage between two cycles of the upstream molding machine. The method is further intended to reduce the susceptibility of the apparatus to disturbances, as dictated by the handling of the individual container stacks. The method is intended to require simple format parts, and permit a rapid format change when the apparatus is changed over to a different container format. There should be no need for a receiving chamber for receiving all of the ejected container stacks before they are brought together one behind the other.

The above object generally is achieved according to a first aspect of the present invention by a method for stacking containers formed of thermoplastic plastic, which containers are molded and punched out of a film strip, are transferred out of the molding tool in stacking magazines, are removed as stacks from the magazines, and are then further processed, which method comprises: providing a plurality stacking-magazine rows comprised of individual, connected stacking magazines, with the number of stacking-magazine rows outnumbering the number of container rows in the molding tool of the upstream molding machine by at least one; removing containers from the molding tool and stacking the containers in the stacking magazines located in the stacking station; displacing all of the stacking-magazine rows located in the stacking station together, in a direction perpendicular to the stacking direction, by the distance between two stacking-magazine rows; transferring the front stacking-magazine row, in the direction of displacement, to a stack-removal station located to the side of the stacking station; emptying the stacking-magazine row located in the stack-removal station; and, transferring the stacking-magazine row located in the stack-removal station onto the stacking-magazine row located in the rear, seen in the displacement direction, in the stacking station.

The above object generally is achieved according to a second aspect of the invention by an apparatus for stacking containers, formed of thermoplastic plastic, downstream of a molding machine, comprising: a plurality of stacking-magazine rows formed of connected individual stacking magazines in which the containers are stacked; a stacking station in which the stacking-magazine rows are set one on top of the other to form a stack cage, can be separated from one another, and can be displaced perpendicular to the stacking direction for containers received by the magazines; a displacement device for transferring the respective lower-most stacking-magazine row from the stacking station into a stack-removal station disposed to the side of the stacking station, the device having a displaceable rake for simultaneously guiding container stacks out of the stacking containers of a row; and a transfer device for transferring the emptied stacking-magazine rows from the stack-removal station onto the rear stacking-magazine row, seen in the direction of displacement of the stacking-magazine rows, in the stacking station. Advantageous modifications of the invention are discussed. The method is described in detail in conjunction with the schematic drawings of the apparatus.

DETAILED DESCRIPTION OF THE PREFERRED EMBODIMENTS

Figure 1:
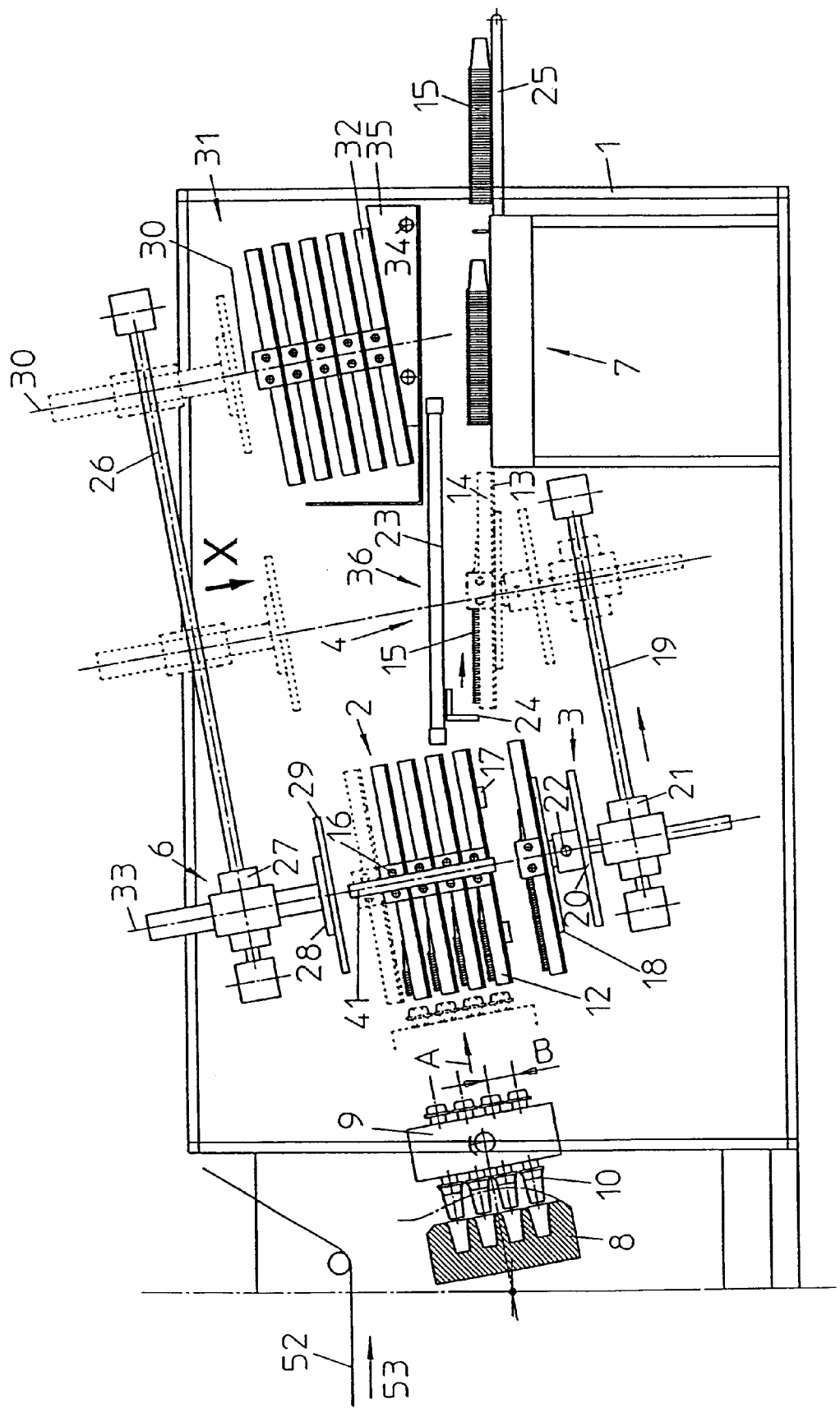
FIG. 1 is a side view of the apparatus according to the invention.
Figure 2:
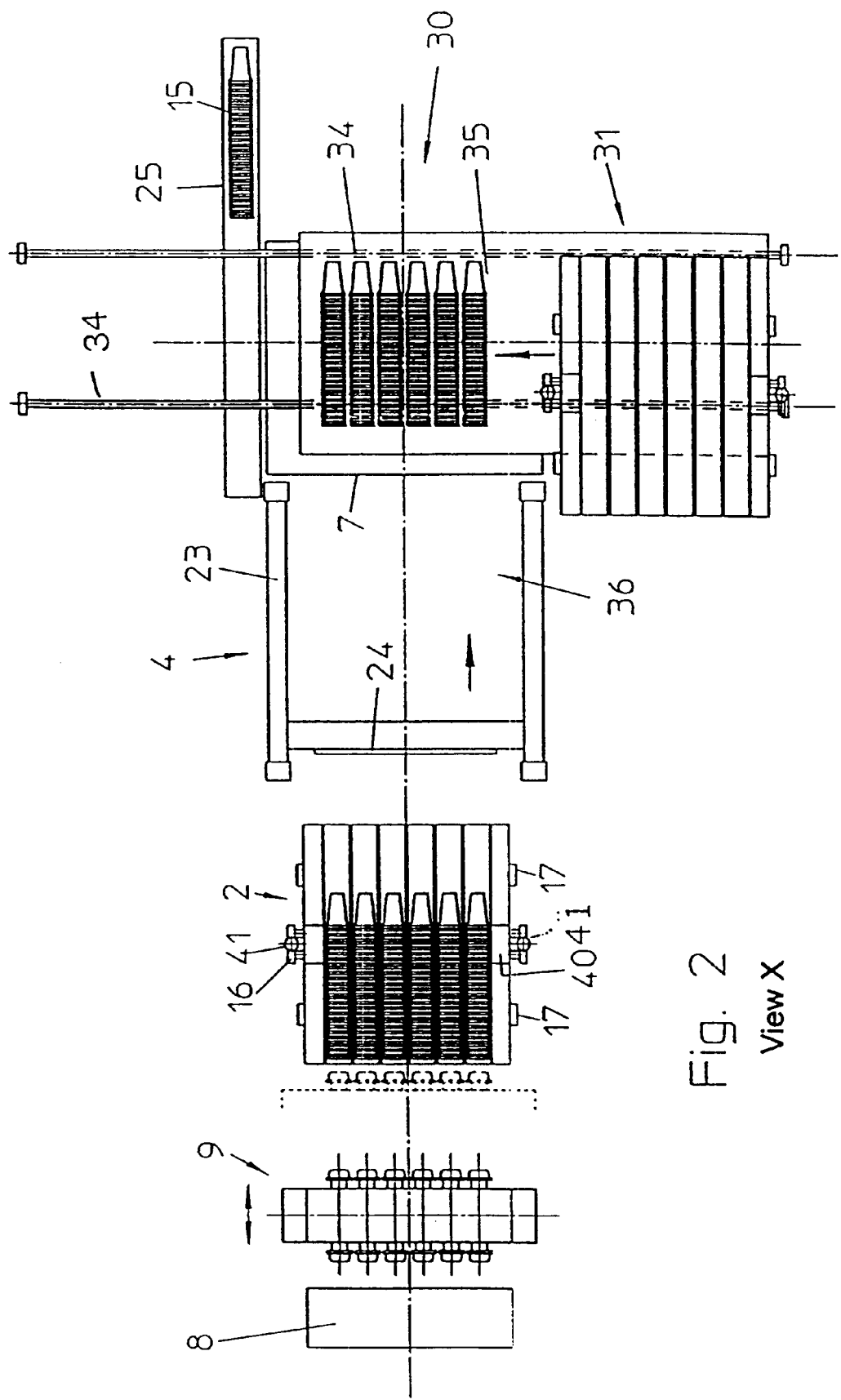
FIG. 2 is a plan view of the apparatus in FIG. 1 in the direction X.
Figure 3:
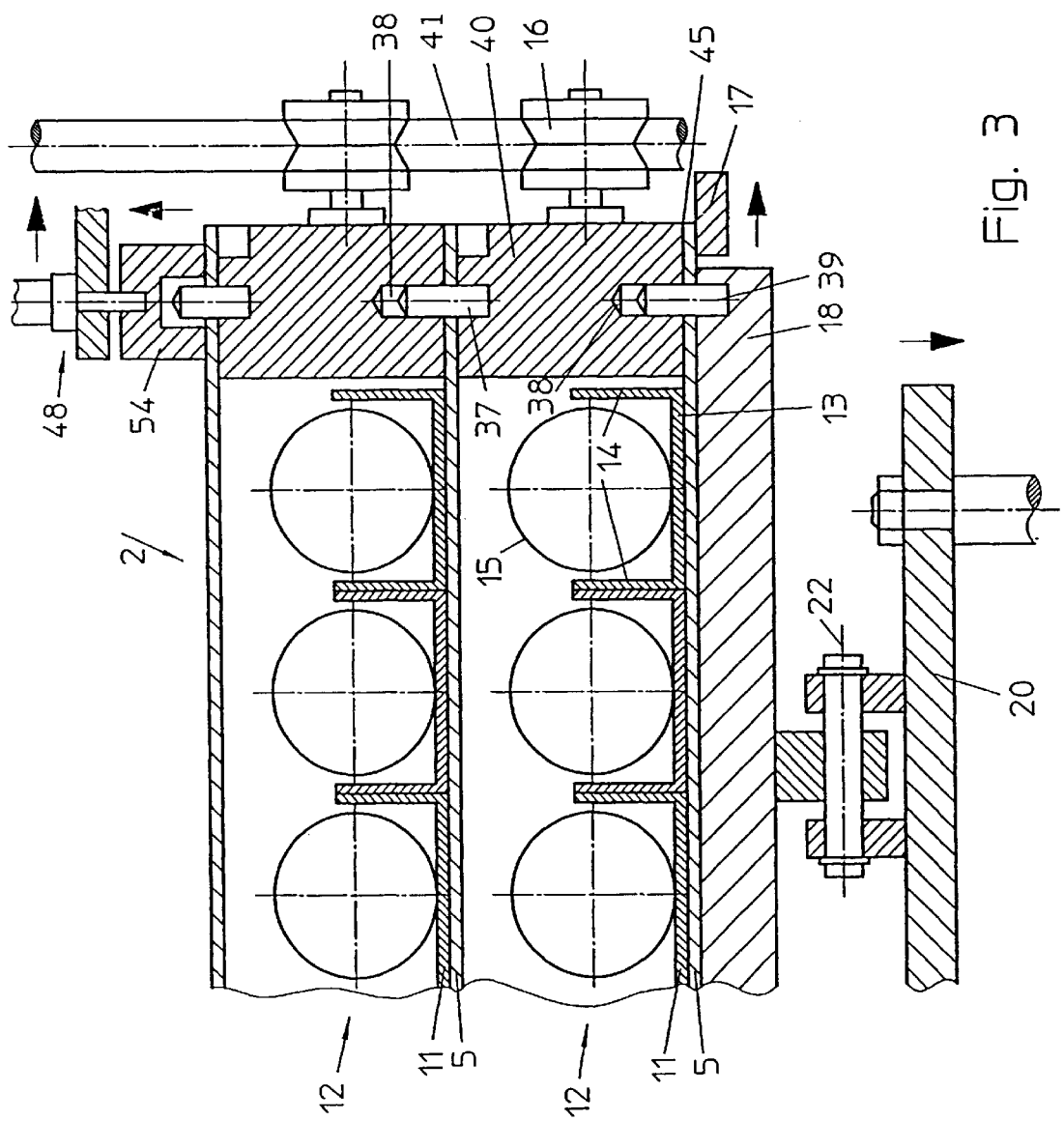
FIG. 3 is a section through a partial region of a stacking station for the apparatus according to the invention.

Turning now to FIGS. 1–3, the apparatus for executing the method comprises a base 1 for receiving a stack cage 2, a displacement device 3, a clearing device 4, a transfer device 6 and a transverse ejector 7. The apparatus is disposed downstream of a thermomolding machine, in which containers 10 comprising thermoplastic plastic are molded and punched out of a heated foil strip 52 that is transported cyclically in the arrow direction 53. The molded containers are then ejected from the opened, pivoted molding tool 8. A four-row molding tool 8 having six cavities per row is shown.

The containers 10 are either ejected directly into stacking magazines, which are correspondingly disposed in front of the pivoted molding tool 8, or, as shown, the containers 10 are received in an expedient manner onto a container transfer device 9, are pivoted by 180° and are transferred into the stacking magazines 11 (see FIG. 3) disposed in the stacking station 33. A plurality of stacking magazines 11 forms a stacking-magazine row 12, and the plurality of stacking-magazine rows 12 together forms the stack cage 2.

Each stacking magazine 11 comprises a floor or bottom 13 with upwardly extending as shown side parts 14, so that each stack of containers 15 is sufficiently supported and held. All of the stacking magazines 11 of a stacking-magazine row 12 are connected together via a plate 5 that extends beneath the respective floors 13 and has respective spacers 40 disposed at its lateral ends. Running rollers 16, which cooperate with respective stationary guides 41, are mounted on the lateral end surfaces of the spacers 40. In this way, the stacking-magazine rows 12 can be displaced, individually and together, on the guides 41, perpendicular to the stacking direction A, which in FIG. 1 is inclined with respect to the horizontal.

As shown in FIG. 3, centering pins 37 disposed in the upper surface of the spacers 40 and corresponding centering bores 38 on the underside of the spacers 40 center the individual stacking-magazine rows 12 relative to one another. The lowermost stacking-magazine row 12 is retained by moveable stops 17 (mounted on a frame not shown), which can be displaced laterally to release the lowermost stacking-magazine row 12. The released stacking-magazine row 12 is received by a table 18, which can be adjusted in height. During this process, pins 39 disposed in the surface of the table 18 impact or extend into the centering bores 38 in the spacers 40 of the released row 12. The table 18 is a component of the displacement device 3 (see FIG. 1), which further comprises a sliding member 21 that can be displaced on stationary guides 19 in the stacking direction A (as shown in FIG. 1) or horizontally, and a console 20. The console 20 is mounted or guided to be displaced in the sliding member 21 in a direction generally perpendicular to the axes of the guides 19, and supports the table 18. The table is mounted on the console 20 to pivot at a point of rotation 22. Drives, not shown, are provided for displacing the console 20 relative to the sliding member 21, for displacing the sliding member 21 on the guides 19, and for tilting the table 18 in the point of rotation 22.

If finishing processes are involved, it can be advantageous to rotate the cup or container stacks 15 by 180° prior to their ejection from the stacking-magazine rows 12, for example, so the stacks are transferred opening-first onto the transverse ejector 7. For this purpose, in a modification of the invention, it is proposed to provide the table 18 with a pivoting device, not shown, that can rotate by 180°. This device is controlled to execute the pivoting movement before the container stacks 15 are ejected from the row 12 in the clearing device 4, and rotates back into the initial position after the ejection.

The clearing device 4 comprises a drive 23 and guide arrangement that displaces the rake 24 horizontally. The rake 24 is embodied such that it can simultaneously transfer the container stacks 15 located in a stacking-magazine row 12 onto the transversely-displaceable ejector 7, e.g., in the form of a conveyor belt, that then transfers the individual container stacks 15 onto a longitudinal conveyor belt 25 in a known manner—namely consecutively.

Disposed above the stack cage 2 is the transfer device 6 comprising stationary longitudinal guides 26 (only one of which is shown), a sliding member 27 that is guided on the guides 26, and a console 28 that is disposed on the sliding member 27 and can be displaced in a direction perpendicular to the guides 26 relative to the sliding member 27, and supports a retaining plate 29. The retaining plate 29 has holding devices, for example, in the form of a latching device, so that it can securely hold a stacking-magazine row 12 and place it onto the uppermost stacking-magazine row 12 of the stack cage 2 in the stacking station 33.

According to a further feature of the invention, a conversion station 30 may be provided above the transverse ejector 7. This station 30 can receive an entire stack cage 31, that is, a plurality of superposed stacking-magazine rows 32. In such case the transfer device 26 is embodied, in terms of its displaceability, such that it can receive the stacking-magazine rows 12 or 32 individually in the conversion station 30 and transfer them into the stacking station 33, and vice versa. Thus, when the molding machine is converted to a different container 10 with a different geometry, the transfer device 6 can receive the format-dependent stacking-magazine rows 12 located in the stacking station 33 and transfer them individually into the conversion station 30. From here, they are removed in sets. The new set of stacking-magazine rows 32 is inserted, and the rows are transferred by the transfer device 6 individually into the stacking station 33. A receiving plate 35 that is twice as wide as the stacking-magazine rows 12, 32 and can be displaced transversely on guides 34 is preferably disposed in the conversion station 30, so after the stacking station 33 has been unloaded, it is possible to displace the stacking-magazine rows 32, which are already being held on the receiving plate 35, transversely on the guides 34 such that the transfer device 6 can receive and transfer the rows. The advantage of this is that the stacking-magazine rows 32 can already be made available for the conversion during the production of the containers 10 (FIG. 2), and the exchange of the stacking-magazine rows 12, 32 can be effected continuously and automatically: Unloading/displacement/loading. This can be performed in the shortest possible time, without manual intervention and behind closed protective coverings, without the risk of an accident.

The method is executed as follows:

At the start of production, stacking-magazine rows 12 are disposed in the stacking station 33, with the number of rows 12 outnumbering the container rows of the molding tool 8 by at least one. This extra stacking-magazine row 12 sits in the uppermost position in the stacking station 2. Containers 10 are stacked in the lower stacking-magazine rows or rows 12, while the uppermost stacking-magazine row 12 remains empty.

After a predetermined number of cycles, all of the stacking-magazine rows 12 in the stacking station 33, that is, the entire stack cage 2, travel downward between two cycles of the upstream molding machine. Afterward, containers 10 are also stacked in the uppermost stacking-magazine row 12, while the lowermost stacking-magazine row 12 is no longer loaded. This is achieved by the following procedure: The table 18 is positioned to support and center the lowermost stacking-magazine row 12 (see position in FIG. 3), and then the stop 17 is retracted, the table 18 is displaced by the distance B and the stop 17 is re-inserted to catch and support the plate 5 of the next or new bottom row 12. The table 18 with the row 12 on its surface is lowered further and guided into the stack-removal station 36 by the displacement device 3, and pivoted abut point 22 into a horizontal position, so the rake 24 can transfer the container stacks 15 onto the transverse ejector 7. The table 18 then is tipped back into the inclined position, i.e., in direction A, and the retaining plate 29 of the transfer device 6 grasps the stacking-magazine row 12 lying on the table 28 and then raises and transfers it onto the uppermost stacking-magazine row 12 in the stacking station 33. The table 18 is simultaneously brought back into the stacking station 33, and positioned to support the lowermost stacking-magazine row 12, so this row can be retrieved after a predetermined, adjustable number of molding cycles and transferred into the stack-removal station 36.

Figure 4:
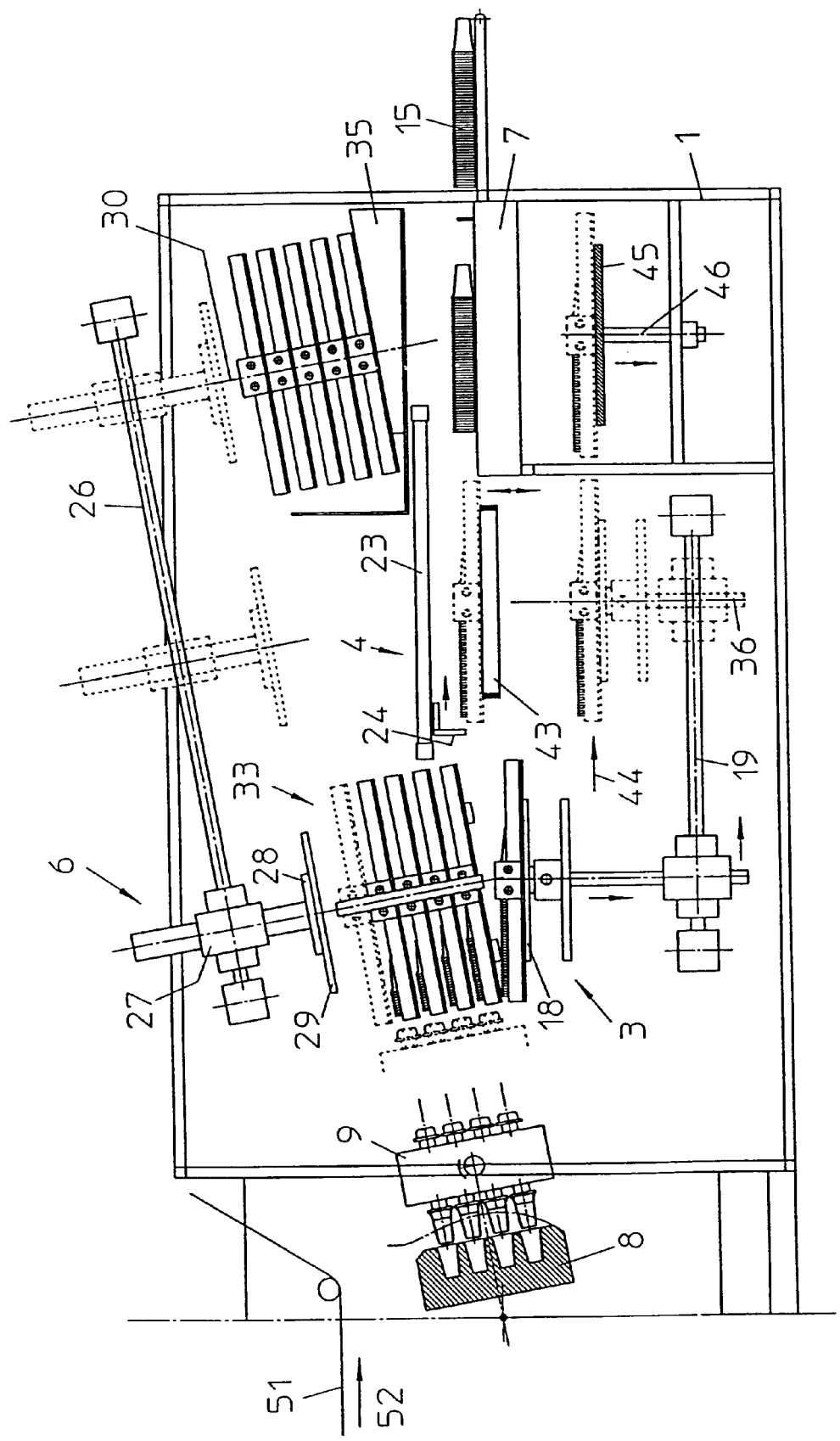
FIG. 4 shows a variation of the apparatus according to the present invention, in a side view.

FIG. 4 illustrates an advantageous variation of the method and the accompanying apparatus of FIGS. 1–4. This variation proves advantageous if the apparatus has a large number of cycles, and if relatively few containers can fit in the stacking magazines 11—whether because of the stacking spacing of the container or because of relatively-short stacking magazines 11, which then permit a short structure of the apparatus as a whole.

In this case, the stacking-magazine rows 12 must be displaced relatively frequently if there are three or four container rows in the molding tool 8. For example, if each stacking magazine 11 can hold forty containers 10, in a four-row molding tool 8, the stacking-magazine rows 12 must be displaced after ten cycles. Each stacking magazine 11 receives ten containers in each position, i.e., 40 pieces. If the apparatus is operated at 30 cycles per minute, this means that 20 seconds remain for removing the lowermost stacking-magazine row 12, tilting it, transferring it—possibly by pivoting it—unloading it, possibly pivoting it back, tilting it, taking it up and transferring it onto the uppermost stacking-magazine row 12 in the stacking station 33. This process could be managed better in terms of time through the use of two stacking-magazine rows 12 more than the number of container rows in the molding tool. It is still necessary, however, to move the table 18 downward, tilt it, transfer it into the stack-removal station 36, possibly pivot it by 180°, clear the container stacks 15, tilt the table 18, possibly pivot it back by 180°, guide it back and lift it.

The solution according to FIG. 4 avoids these time-related problems. It is proposed to arrange a lifting device 43 in the stack-removal station 36, with the device lifting each stacking-magazine row 12 from the table 18, which is maintained in a horizontal position, and holding the row 12 ready for clearing or ejection of the container stacks 15. Once the stacking-magazine row 12 has been lifted from the table 18, the table 18 can travel back into the stacking station 33 and receive the next stacking-magazine row 12. The transfer device 6 then receives the stacking-magazine row 12 from the lifting device 43 and places it onto the uppermost stacking-magazine row 12 in the stacking station 33.

FIG. 4 additionally illustrates a variation of the exchange of all stacking-magazine rows 12 when the apparatus is converted. A transverse ejector, represented by the arrow 44, is disposed in the stack-removal station 36. In a conversion, the ejector pushes the stacking-magazine rows 12 located on the table 18 horizontally onto a table 45, which is disposed to be displaced vertically beneath the transverse ejector 7 in the conversion station 46. In this way, all of the stacking-magazine rows 12 are deposited consecutively onto the table 45. At the same time, the transfer device 6 removes the new stacking-magazine rows 32 individually from the conversion station 30 and transfers them into the stacking station 33, so the stacking-magazine rows 12, 32 are exchanged simultaneously.

Figure 5:
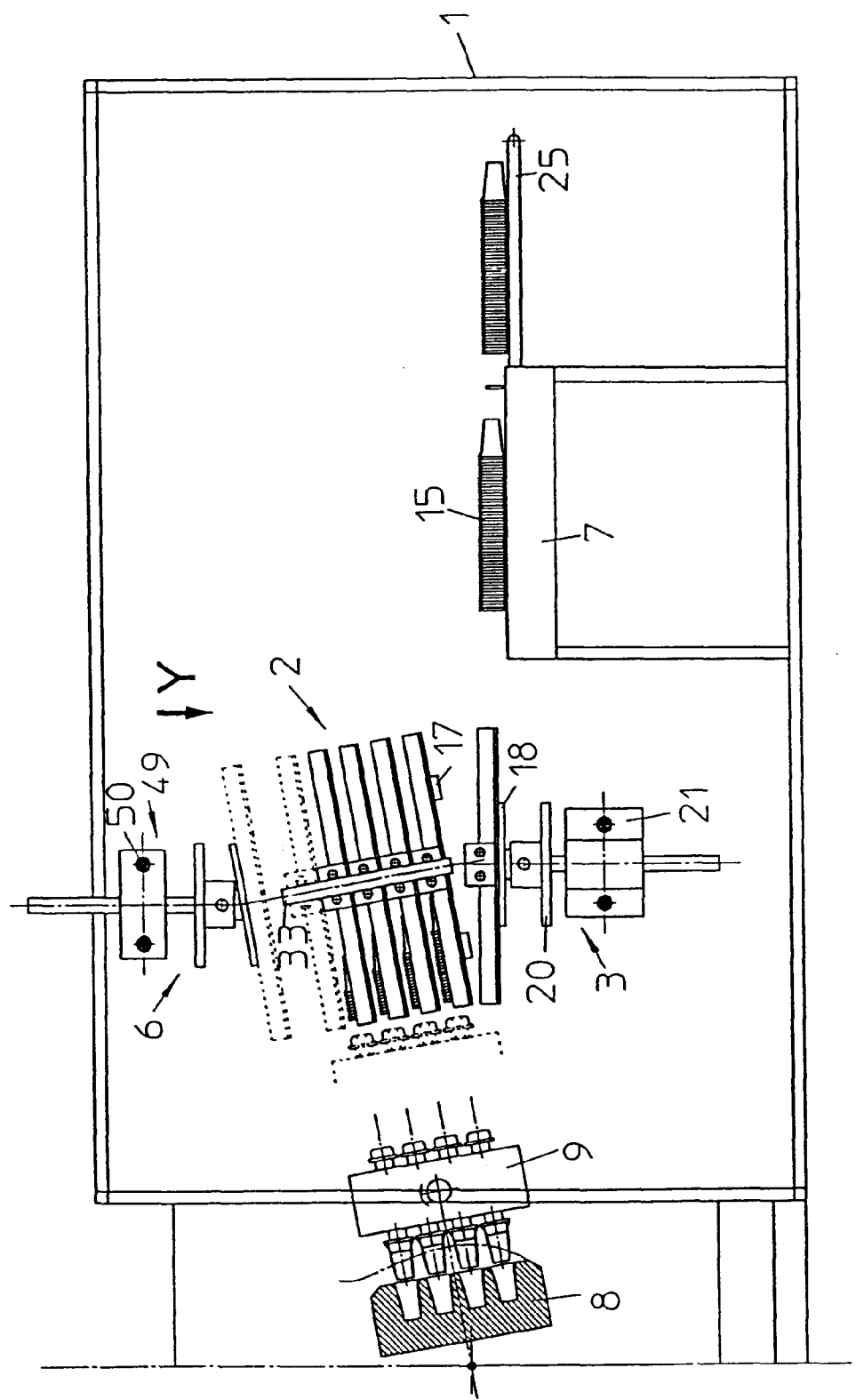
FIG. 5 shows a further variation of the apparatus according to the invention, in a side view.
Figure 6:
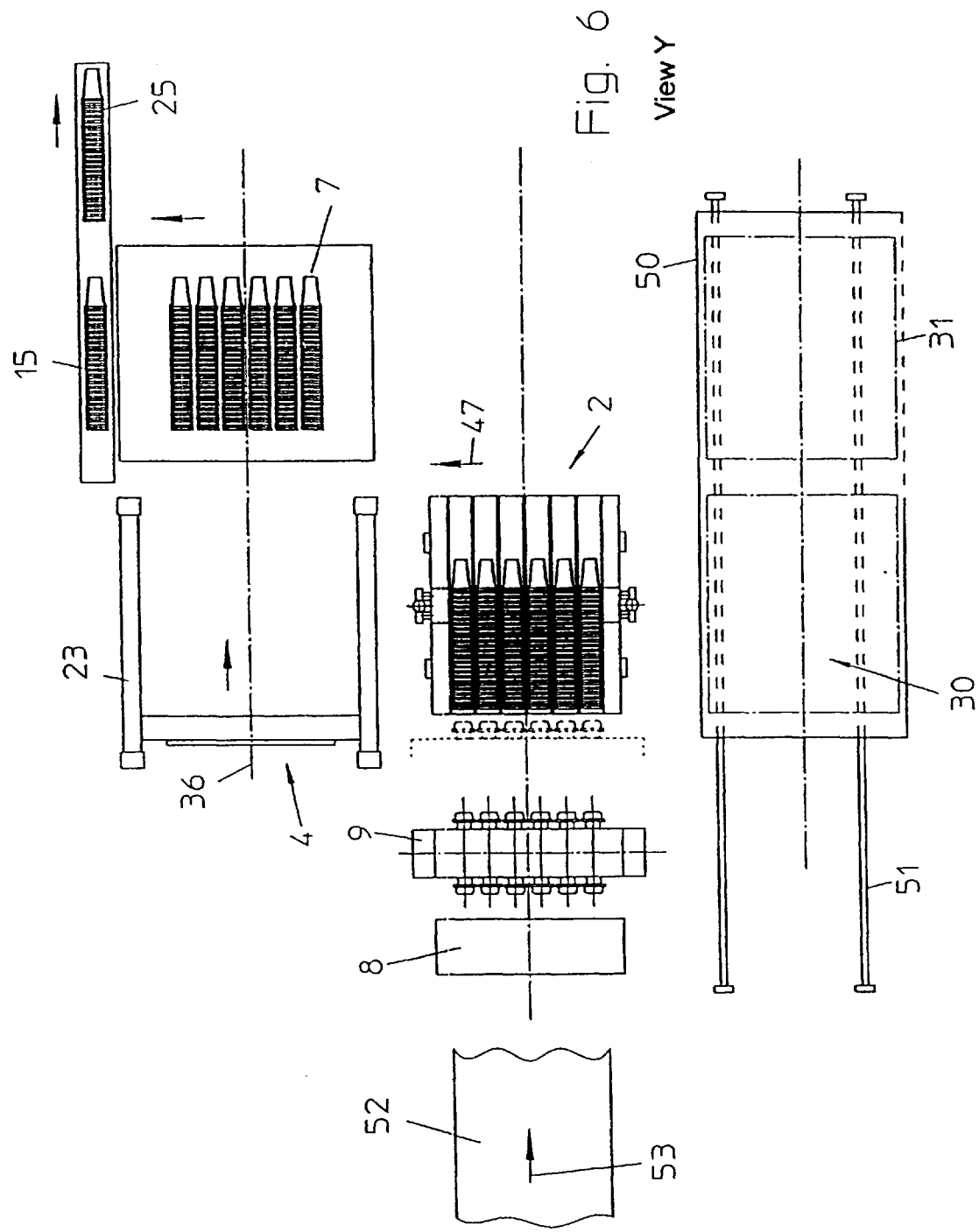
FIG. 6 is a plan view in the direction Y in FIG. 5.

FIGS. 5 and 6 are a side view and a plan view (direction Y of FIG. 5), respectively, of another embodiment of the apparatus for executing the method. The stack cage 2 with stacking-magazine rows 12 is arranged in the same manner. The table 18 again is vertically displaceable, and the lowermost stacking-magazine row 12 is received as follows: After the stops 17 have been retracted, the stacking-magazine row is lowered due to gravity, and placed onto the table 18 individually, while the stacking-magazine rows 12 disposed above it are correspondingly held back. After the table 18 has been lowered vertically, it travels horizontally to the rear—that is, transversely to the feed direction of the film strip 52 processed in the molding machine—in the direction of the arrow 47 (FIG. 6) until it reaches the stack-removal station 36, in which the clearing device 4 disposed there transfers the container stacks 15 onto the transverse ejector 7, which then transfers the container stacks 15 onto the longitudinal conveyor belt 25 again. The transfer device 49, which can be displaced in height and horizontally on a pair of guide rails 50, and has gripping devices that can be tilted into an inclined position, transfers the empty stacking-magazine rows 12.

This embodiment of the apparatus can also include an arrangement of a pivoting device on the table 18 for pivoting the stacking-magazine rows 12 by 180°. In this embodiment of the apparatus, a conversion station 30 is provided on the front side of the apparatus, and can likewise be provided with a console 50, which is twice as wide as the stack cages 2, 31 and is displaceable on guides 51. The apparatus can be converted analogously in the advantageous, described procedure. In an apparatus embodied in this manner, it is also possible to arrange a lifting device, which is analogous to the lifting device 43, in the stack-removal station 36 and use it to receive the stacking-magazine rows 12.

It has proven advantageous to use a pressing device 48 to press the stacking-magazine rows 12 located in the stacking station 33 against the stops 17 while the containers 10 are being stacked, so the stacking-magazine rows 12 assume a precisely-defined position without gaps, which makes the stack less prone to disturbances. Before an empty stacking-magazine row 12 is positioned on top, the pressing action is halted, and the pressing device 48 is displaced laterally, or disengaged, so as not to impede the placement of the empty stacking-magazine row. The pressing device 48 is re-engaged after the placement. FIG. 3 effectively indicates such a pressing device 48 on top of the uppermost stacking-magazine row 12. It is held to rotate on the guides 41, and is equipped with a displaceable pressing part 54.

The invention now being fully described, it will be apparent to one of ordinary skill in the art that many changes and modifications can be made thereto without departing from the spirit or scope of the invention as set forth herein.

What is claimed is:

1. An apparatus for stacking containers, formed of thermoplastic plastic, downstream of a molding machine, comprising:
   a plurality of stacking-magazine rows formed of connected individual stacking magazines, in which the containers are stacked;
   a stacking station in which the stacking-magazine rows are set one on top of the other to form a stack cage, can be separated from one another, and can be displaced perpendicular to a stacking direction for inserting containers into respective magazines;
   a displacement device is for transferring a respective lowermost stacking-magazine row, after separation from the stack cage, from the stacking station into a stack-removal station disposed to a side of the stacking station, the device having a displaceable rake for simultaneously guiding the container stacks out of stacking-magazines of a row; and,
   a transfer device for transferring an emptied stacking-magazine row from the stack-removal station onto a rear stacking-magazine row of the stack cage, seen in the direction of displacement of the stacking-magazine rows, in the stacking station.

2. The apparatus according to claim 1, wherein said stacking station includes stationary guides disposed adjacent opposite ends of said stack cage of stacking-magazine rows and extending in a direction perpendicular to the stacking direction; and guide rollers that cooperate with said stationary guides disposed at ends of each stacking-magazine row, to permit displacement of the stacking-magazine rows transversely to the stacking direction.

3. The apparatus according to claim 1, wherein the transfer device comprising: a retaining plate mounted on a sliding member for displacement perpendicular to the stacking direction and having gripping devices, and with the sliding member being mounted for sliding displacement in the stacking direction on stationary guides extending in the stacking direction.

4. The apparatus according to claim 1, wherein the apparatus has a conversion station for receiving a stack cage, and the transfer device is displaceable such that the stacking-magazine rows can be removed individually from the conversion station; and wherein the apparatus further has a removing station disposed beneath the conversion station and having a table that can be adjusted in height, and a transverse ejector for pushing an emptied stacking-magazine row from the displacement device onto the table of the removing station.

5. The apparatus according to claim 1, wherein said stacking station further comprises: retractable stops engaging a lower surface of a lowermost of said stacking magazine rows in said stacking station to prevent displacement of said stack case in a downward direction; and, a pressing device for pressing the stacking-magazine rows disposed in the stacking station against the stops.

6. The apparatus according to claim 1, wherein each stacking-magazine row includes centering devices for centering it relative to adjacent stacking-magazine rows.

7. The apparatus according to claim 6, wherein the centering device comprises centering pins and mating centering bores disposed on facing surfaces of adjacent stacking-magazine rows.

8. The apparatus according to claim 1, wherein the displacement device comprises a displaceable table for receiving the lowermost stacking-magazine rows, with the table being mounted on a console that is displaceable in the stacking direction, and is displaceable relative to the console.

9. The apparatus according to claim 8, further comprising a lifting device disposed in the stack-removal station for receiving a stacking-magazine row from the table.

10. The apparatus according to claim 1, wherein the apparatus has a conversion station for receiving a stack cage, and the transfer device is displaceable such that the stacking-magazine rows of the stack cage can be removed individually from the stacking station and deposited in the conversion station, and vice versa.

11. The apparatus according to claim 10, wherein a displaceable receiving plate for receiving two adjacent stack cages is disposed in the conversion station and is mounted on guides for displacement so that either stack cage is selectively positioned to cooperate with said transfer device.

* * * * *